April 26, 1955  S. R. RICH  2,706,906
MODULUS DETERMINING SYSTEM
Filed June 1, 1949  3 Sheets-Sheet 1

INVENTOR
STANLEY R. RICH
BY
ATTORNEY

INVENTOR
STANLEY R. RICH
BY Alfred H. Rosen
ATTORNEY

April 26, 1955
S. R. RICH
2,706,906
MODULUS DETERMINING SYSTEM
Filed June 1, 1949
3 Sheets-Sheet 3
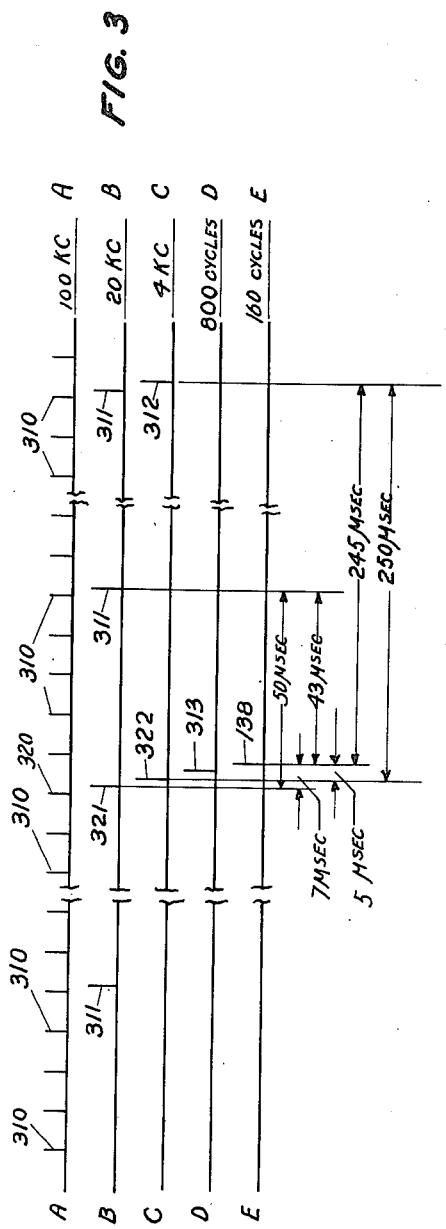
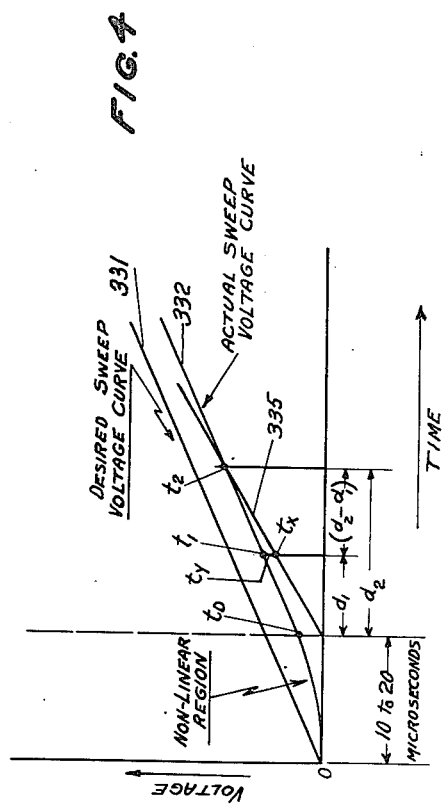
INVENTOR
STANLEY R. RICH
BY Alfred H. Rosen
ATTORNEY

United States Patent Office 2,706,906
Patented Apr. 26, 1955

2,706,906

MODULUS DETERMINING SYSTEM

Stanley R. Rich, Newton Center, Mass., assignor to Magnetic Amplifier Corporation, Waltham, Mass., a corporation of Massachusetts Application June 1, 1949, Serial No. 96,430

5 Claims. (Cl. 73—67)

My invention relates to the determination of the elastic properties of solid materials by means of sound waves, and more particularly to novel means for readily and accurately determining the instantaneous elastic modulus, namely Young's modulus, of such materials.

Solid materials may loosely be classified into engineering materials and non-engineering materials. Among the former are most metals, rock, concrete, crystals, and ceramics, while among the latter are nylon, acetate and viscose rayon, cotton, wool, silk, paper, leather, rubber, linoleum, plastics, and soap, for example. For many years it has been known that a knowledge of Young's modulus of engineering materials is vital to their successful use in structures of various kinds, such as buildings, bridges, roads, vehicles, aircraft, for example. More recently it has been realized that a knowledge of Young's modulus of non-engineering materials is equally vital, if the processes by which they are manufactured into useful articles and otherwise employed are to be succcessfully carried out with maximum efficiency and at minimum cost, and if the articles comprising them are to be of optimum quality. More particularly non-engineering materials are so defined because Young's modulus is not a fixed constant through even ordinary ranges of internal stress as it is in engineering materials. It is specifically the variations in the dynamic modulus of elasticity with changes in internal stress, external load, temperature, humidity, etc., that define non-engineering materials as differing from engineering materials. Engineering materials show no substantial changes in their elastic properties due to reasonable variations in load, stress, temperature, humidity, etc. In short, they obey Hooke's law.

The present invention makes use of the pulsesonic technique to determine dynamic modulus of elasticity instantaneously, thereby making possible for the first time continuous observation of changes in elastic properties as almost any desired variations of external and/or internal conditions are imposed on a test specimen.

As students of physics are well aware, Young's modulus of elasticity is ordinarily determined with respect to elongated bodies, and is defined as follows:

$$\text{Young's modulus} = \frac{\text{stress}}{\text{strain}}$$

where $$\text{stress} = \frac{\text{force}}{\text{cross-sectional area}}$$

and $$\text{strain} = \frac{\text{change in length}}{\text{original length}}$$

This modulus is conventionally measured in the case of a wire, for example, by applying the force to stretch the wire and observing the original cross-sectional area and length of the wire and the change in length when the wire is strained. The conventional technique requires that the wire actually be stretched by a known force, and is both time consuming and laborious. In cases where the solid material is of irregular shape, such as a sheet of paint or plastic, a piece of cloth having weft and woof fibers, or a plastic dish, for example, the determination of Young's modulus by the conventional techniques becomes practically impossible unless the object of which it is desired to know the modulus is destroyed and an elongated regular piece of it is examined. Since it is not practical to destroy each manufactured article for the purpose of determining its physical characteristics, new techniques are very much required.

It has been found that when vibrational disturbances are propagated through a solid material, the square of the velocity of propagation of the compressional component $C_p$ multiplied by the density $\rho$ of the material, is equal to the instantaneous modulus of elasticity for the material. This is Young's modulus, which may be termed E. That is:

$$E = \rho C^2$$

Attempts have been made to generate and propagate sound waves in many materials, and to measure the velocity of propagation $C_p$ of the compressional waves in order to determine Young's modulus. However, when sound waves are propagated in a solid material, they appear not only as compressional waves, but also as transverse waves and shear waves. These various forms of waves are, moreover, propagated with different velocities, the compressional waves having the greatest velocity. In addition, reflections from edges and discontinuities in the material result in reverberations, and these reflections and reverberations cause practically unpredictable cancellation and reenforcement patterns, thereby producing innumerable intermixed sets of such waves at any point of observation. As a result, the observation of a compressional wave being propagated in a solid has been found to be extremely difficult, and has necessitated the evolution of cumbersome and time consuming techniques. Such methods of wave characteristic determination as have been devised are generally limited to certain shapes of specimens, such as very thin wires, or fibres, in which compressional waves are made to predominate by choosing such proper specimen geometry.

My invention proposes a system which measures automatically the velocity of propagation of compressional sound waves in solid materials of any shape or size. This is accomplished by measuring the time taken for a short acoustic pulse to travel between a transmitter and a receiver over a given path. The shortest measured pulse propagation time over the known distance yields the velocity of compressional sound waves in the material. The square of this observed velocity, $C^2$, times the known density, $\rho$, of the material equals Young's modulus, E. My system is readily made to determine Young's modulus of solid materials, both automatically, and continuously. My system is so constituted that substantially no limitation is placed upon specimen geometry, making possible great flexibility of application. These determinations are made non-destructively and, in certain caes, on finished materials in place in a larger fabricated structure.

More specifically, my system includes means for generating pulses of sound energy at a fixed repetition rate and means for introducing such pulses into a specimen under examination. The repetition rate of the pulses introduced into the specimen is so chosen that reflections and reverberations die down to a sufficient extent between such pulses so that first arrival energy at an observation point cannot be confused with reflection or reverberation energy. On the other hand, reverberations and reflections, particularly reflections from ends or edges render sine wave or phase shift techniques practically useless, and the present system is therefore not be to confused with such systems. The system further includes means for producing an electric timing wave and for starting the wave each time a sound pulse is produced in the specimen. A novel feature of my system is the provision of a particular time delay between the initiation of the timing wave and the introduction of the sound pulse into the specimen. This feature greatly reduces or entirely eliminates certain inherent inaccuracies present in such apparatus. The pulse is introduced into the specimen in any suitable region without regard to the type of wave motion that results in the specimen, and is detected after passing through a known straight path in any suitable direction in the specimen, and this regardless of the physical geometry of the specimen. Upon detection, the pulse is employed to actuate an indicator or a suitable recording device in cooperation with the timing wave to provide a measure of the speed of travel of the first arrival energy through the specimen. The system provides features whereby the subsequently arriving pulses following the first pulse to arrive at the detector have no effect upon the indication. This is important because it is difficult, if not impossible, to introduce compressional wave energy into a specimen without at the same time creating also transverse and shear waves, particularly if the geometry of the specimen is to be unimportant. The system is thus inherently so reliable that there is no need for indicating devices that present a mass of information which must be interpreted by a skilled technician, such as, for example, a cathode ray tube type of indicator. The information that is presented is, rather, always the desired information, and may be presented by way of a meter, or if desired may be presented directly to a computing or other utilization system. In addition, my system is conveniently arranged to provide ready means whereby it is made internally self-calibrating.

These and other features of my invention will become more apparent from the detailed description of certain embodiments thereof that follows. The description refers to the accompanying drawings, wherein:

Fig. 3 is a graphical representation of the time relations existing among certain pulses in the circuit of Fig. 2; and Fig. 4 is a graph illustrating the nature of timing waves.

Figure 1:
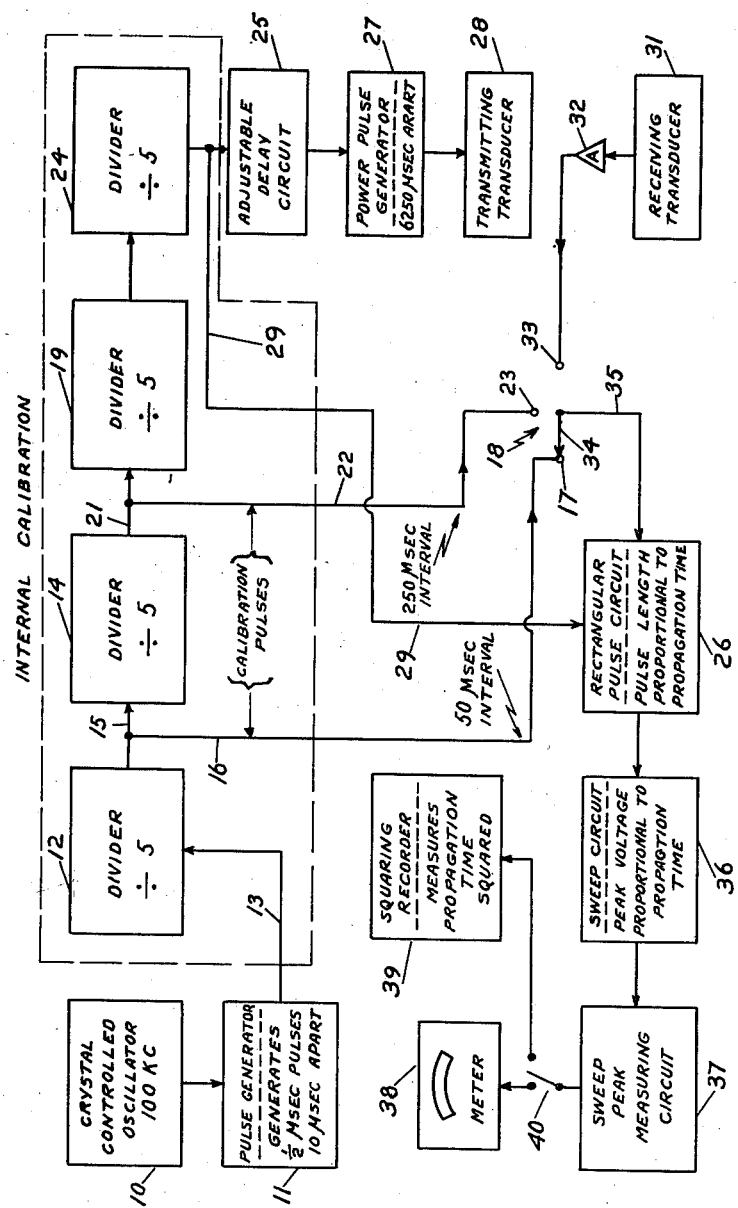
Fig. 1 is a block diagram of a system in accordance with the invention.

Referring now to Fig. 1, a stable oscillator 10, which may be a crystal-controlled oscillator, is arranged to oscillate at a suitable frequency, which is here 100 kilocycles per second. The oscillator controls a pulse generator 11 which is arranged to produce short electric pulses, each preferably about 0.5 microsecond long, spaced about 10 microseconds parts. The pulses of the pulse generator are provided to a first frequency divider 12 via a suitable connection 13. The first divider produces pulses at the rate of 20,000 per second, and provides them to a second divider 14 via a suitable connection 15. A first calibration signal line 16 is suitably coupled to the output of the first divider 12, and provides pulses at 50 microsecond intervals to a first position contact 17 of a selector switch 18. The second divider produces pulses at the rate of 4,000 per second, and provides them to a third divider 19 via a suitable connection 21. A second calibration signal line 22 is suitably coupled to the output of the second divider 14, and provides pulses at 250 microsecond intrevals to a second position contact 23 of switch 18. The third divider 19 produces pulses at the rate of 800 per second, and provides them to a fourth divider 24. The fourth divider produces final output pulses at the rate of 160 per second, or at intervals of 6250 microseconds between pulses. The final output pulses are provided to an adjustable delay circuit 25 and simultaneously to a rectangular pulse circuit 26 via a first input 29 thereto.

The delay circuit 25 delays the output pulse a suitable amount of time, as will be discussed in greater detail below, and then provides the delayed output pulse to a power pulse generator 27. A transmitting transducer 28 is connected to the output of the power pulse generator, and is adapted to produce compressional or other mechanical wave pulses corresponding to the electric output pulses in a material being tested. A separate receiving transducer 31 is adapted to detect said waves in such material and produce a corresponding electric pulse. The received energy is provided to an amplifier 32 and thence to a third position contact 33 of switch 18. The movable contact 34 of switch 18 is connected to the rectangular pulse circuit 26 via a second input 35 thereof. The final output pulse in input 29 initiates a rectangular pulse in the rectangular pulse circuit 26, while received energy or a calibration pulse in input 35 terminates the rectangular pulse.

A sweep circuit 36 is connected to the output of the rectangular pulse generator 26, and produces a sweep voltage of sawtooth form, of which each cycle commences and ends with the rectangular pulse. A sweep peak measuring circuit 37 measures the peak value of the sweep voltage. A meter 38, for example a vacuum tube voltmeter, and a squaring rectorder 39 are both arranged to be connected to the sweep peak measuring circuit 37, selectively, via a suitable selector switch 40. The sweep peak measuring circuit provides a unidirectional (D. C.) voltage of which the magnitude is proportioned to the length of the rectangular pulse from pulse circuit 26. The meter 38 measures this magnitude, while the recorder 39 is arranged to provide a record in accordance with the square of this magnitude. From the relation $E=\rho C^2$, it will be seen that the squaring function is useful in the direct presentation of E.

Figure 2:
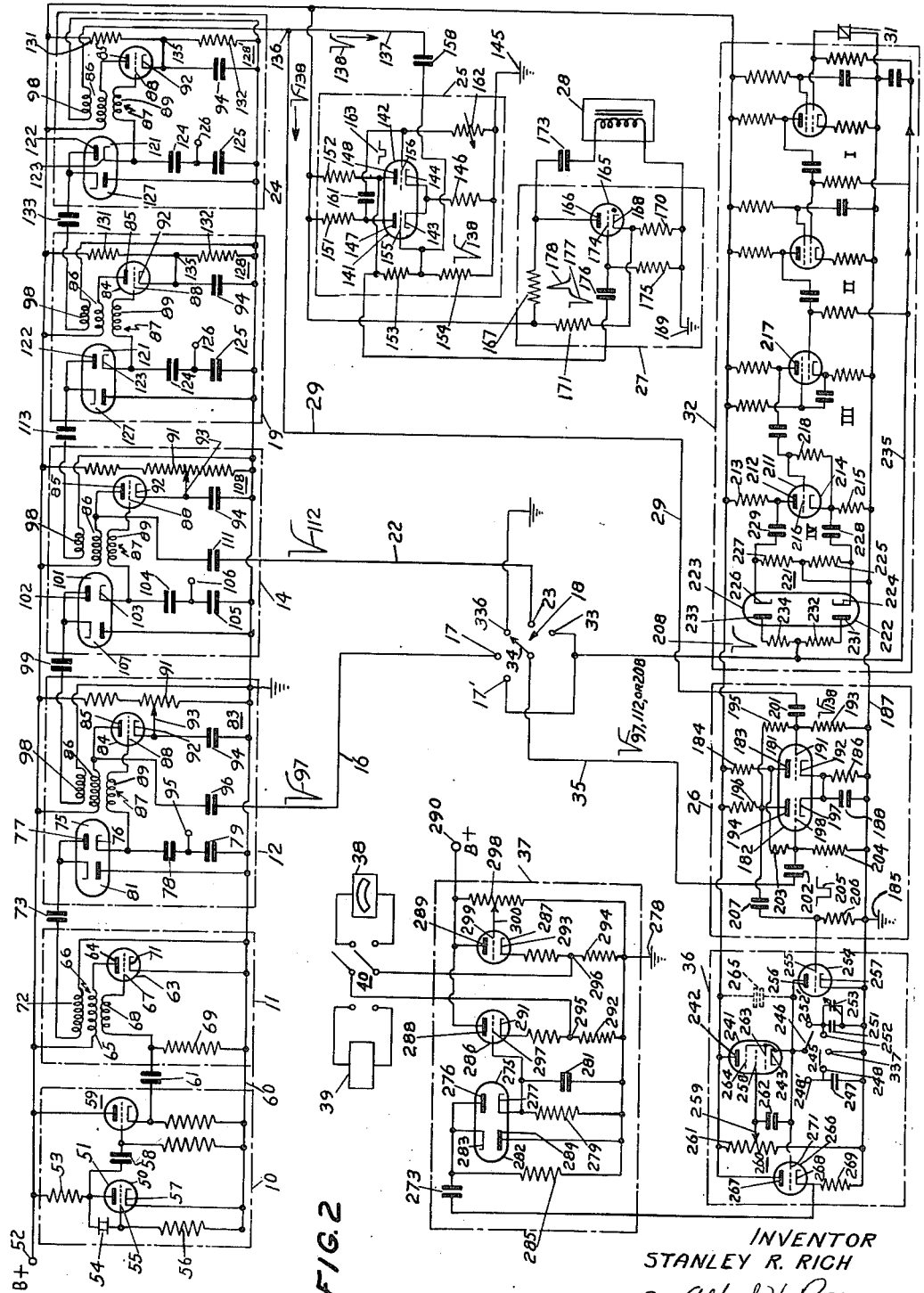
Fig. 2 is a circuit diagram of Fig. 1.

Referring now to Fig. 2, the stable oscillator 10 comprises an electron tube 50 of which the anode 51 is connected to a source (not shown) of anode potential at a B+ terminal 52 via a suitable resistor 53. A controlling crystal 54 is connected between the anode and the control grid 55. A resistor 56 is connected between the control grid and the cathode 57. The cathode 57 is connected to a ground line 60, which is common to all the frequency generating circuits. The oscillating output of the oscillator tube is coupled from the anode 51 via a capacitor 58 to a cathode follower 59. The output of the cathode follower is coupled via a capacitor 61 to pulse generator 11.

Pulse generator 11 is a blocking oscillator, comprising an electron tube 63 which has an anode 64 connected to the B+ terminal 52 via the primary winding 65 of a transformer 66. The control grid 67 is connected via a first secondary winding 68 of transformer 66 and a resistor 69 in series to the cathode 71, which is connected to the ground line 60. The capacitor 61 is connected to the junction of the resistor 69 and secondary winding 68. An output signal is provided by a second secondary winding 72 of transformer 66, which is connected at one end to the cathode 71 and at the other end to a coupling capacitor 73. The pulse generator 11 is constructed to oscillate at about 100 kilocycles per second, producing pulses about 0.5 microseconds wide, and is synchronized by the stable oscillator 10 via capacitor 61.

The first divider 12 includes a first frequency divider circuit having a first diode 75, of which the cathode 76 is connected to the ground line 60 via two capacitors 78 and 79 in series, and the anode 77 is connected via the coupling capacitor 73 to output secondary winding 72. The diode 75 is poled to charge the cathode sides of the capacitors 78 and 79 positively with respect to the ground sides thereof, and the secondary winding 72 is arranged so to charge these capacitors. A second diode 81 is connected between the first diode anode 77 and the ground line 60 with reversed polarity, and functions as an overshoot clipper or clamp, maintaining the voltage applied to the anode 77 positive with respect to the ground line 60. Conveniently, the two diodes 75 and 81 may exist in a single envelope.

The first divider 12 includes also a second blocking oscillator 83 which oscillates at a natural frequency of approximately 20 kilocycles per second, again producing pulses about 0.5 microsecond wide. Blocking oscillator 83 includes an electron tube 84 of which the anode 85 is connected to the B+ terminal 52 via the primary winding 86 of a transformer 87. The control grid 88 of tube 84 is connected to cathode 76 via a first secondary winding 89 of the transformer 87. A resistor 91 is connected between the B+ terminal 52 and the ground line 60, and the cathode 92 of tube 84 is connected to this resistor via a movable tap 93. A by-pass capacitor 94 is connected betwen cathode 92 and ground line 60.

The movable tap 93 adjusts the cathode bias of cathode 92 and determines the positive potential relative to ground line 60 which is required at the control grid 88 to cause the blocking oscillator 83 to commence oscillation. The required grid potential is furnished by the charge on the capacitors 78 and 79. The capacitors 78 and 79 are charged by pulses from the first pulse generator 11, and are chosen of such magnitudes that five such pulses are necessary to provide the required grid potential to cause blocking oscillator 83 to commence oscillation. During the first half cycle of oscillation of blocking oscillator 83, the capacitors 78 and 79 are discharged via grid 88, cathode 92, and capacitor 94 and a portion of resistor 91 in parallel, so that the blocking oscillator 83 oscillates for no more than one cycle. The positive bias on cathode 92 prevents further oscillation in the absence of further sufficient positive potential on the control grid 88. In this manner divider 12 in effect divides the frequency of pulse generator 11.

Capacitors 78 and 79 are in effect a voltage divider, with capacitor 78 much the larger. A tap 95 between them functions as a test terminal for observing the output of pulse generator 11, for example on a test oscilloscope (not shown). This feature is not essential to the invention, and may be omitted, if desired. In such a case, a single capacitor of suitable magnitude may be substituted for capacitors 78 and 79.

The first calibration signal line 16 is coupled to anode 85 via a capacitor 96, and a negative pulse 97 appears therein when blocking oscillator 83 oscillates. An output pulse is coupled from blocking oscillator 83 by a second secondary winding 98 of transformer 87. Secondary winding 98 is connected at one end to ground line 60 and at the other end to a coupling capacitor 99, being so arranged that it provides positive pulses to the capacitor.

The second divider 14 includes a second divider circuit having a frequency dividing diode 101, of which the anode 102 is connected to the capacitor 99 and the cathode 103 is connected to the ground line 60 via two series capacitors 104 and 105. Capacitors 104 and 105 are again a voltage divider having a test terminal 106 connected to their junction. A clamping diode 107 is connected between anode 102 and ground line 60. The second divider 14 includes also a blocking oscillator 108 which is similar to blocking oscillator 83, but oscillates at a natural frequency of 4000 cycles per second. Like parts of blocking oscillators 83 and 108 bear similar reference characters. The control grid 88 of blocking oscillator 108 is connected to cathode 103, and capacitors 104 and 105 are of such magnitude that five pulses from blocking oscillator 83 are required to cause blocking oscillator 108 to commence oscillation.

Again, blocking oscillator 108 oscillates for no more than one cycle. The second calibration signal line 22 is coupled to anode 85 of blocking oscillator 108 via a coupling capacitor 111, and a negative pulse 112 appears therein when blocking oscillator 108 oscillates. The output of blocking oscillator 108 to the third divider 19 appears as a positive pulse at a coupling capacitor 113.

The third divider 19 includes a third divider circuit having a frequency dividing diode 121, of which the anode 122 is connected to the coupling capacitor 113 from blocking oscillator 108, and the cathode 123 is connected to ground line 60 via two capacitors 124 and 125 in series. Capacitors 124 and 125 are again a voltage divider having a test terminal 126 connected to their junction. A clamping diode 127 is connected between anode 122 and ground line 60. The third divider 19 includes also a blocking oscillator 128 which is similar in its essential respects to blocking oscillator 83, but oscillates at a natural frequency of 800 cycles per second, producing very short pulses at intervals of 1250 microseconds. Like parts of blocking oscillators 83 and 128 bear similar reference characters. The control grid 88 of blocking oscillator 128 is connected to cathode 123, and capacitors 124 and 125 are of such magnitudes that five pulses from blocking oscillator 108 are required to cause blocking oscillator 128 to commence oscillation. A voltage divider comprising two resistors 131 and 132 in series is connected between the B+ terminal 52 and ground line 60, and the cathode 92 of blocking oscillator 128 is connected to their junction 135. The potential of junction 135 is such with respect to that of ground line 60 that the above set forth frequency dividing action occurs. A positive output pulse is coupled from blocking oscillator 128 to the fourth divider 24 via a coupling capacitor 133.

The fourth divider 24 is identical in all respects to the third divider 19, and like parts of these two dividers bear like reference characters. However the blocking oscillator 128' of the fourth divider oscillates at a natural frequency of 160 cycles per second, producing final pulses 138 at intervals of 6250 microseconds. These pulses are provided to a junction 136 to which are connected the first input line 29 of the rectangular pulse circuit 26 and the input line 137 of the adjustable delay circuit 25. The final pulses 138 are negative with respect to ground line 60, the secondary winding 98 of transformer 87 of the fourth divider 24 being suitably connected to accomplish this.

The adjustable relay circuit 25 includes a single-shot multivibrator comprising first and second triode sections 141 and 142, respectively, of which the first section 141 is normally conductive and the second section 142 is normally non-conductive. The first and second section cathodes 143 and 144, respectively, are connected together and to ground at 145 via a suitable resistor 146. The first and second section anodes 147 and 148, respectively, are connected to the B+ terminal 52 via suitable anode circuit resistors 151 and 152, respectively. A voltage divider comprising two resistors 153 and 154 in series is connected between the second tube anode 148 and ground 145. The first section control grid 155 is connected to the junction of resistors 153 and 154, and by this connection the first triode section 141 is maintained normally conductive. The input line 137 of the delay circuit 25 is connected to the first section control grid 155 via a coupling capacitor 158, and by this connection the final pulse 138 is applied to the first section control grid 155 to cut off the first triode section 141.

The second section control grid 156 is coupled to the first section anode 147 via a capacitor 161 and to ground at 145 via an adjustable resistor 162. Capacitor 161 and resistor 162 are an adjustable time-constant circuit. The potential of the first section anode 147 rises suddenly when the first triode section 141 is cut-off, and this rise in potential is coupled to the second-section control grid 156 via capacitor 161 to render the second triode section 142 simultaneously conductive. Consequently the potential of the second section anode 148 drops suddenly to initiate a negative rectangular pulse 163. At a subsequent instant following the rise in potential of the second section control grid 156, determined by the adjustment of the resistance of resistor 162, the potential of this grid falls sufficiently toward the potential of ground 145 to cut-off the second triode section 142, so that the potential of the anode 148 thereof returns suddenly to its original or quiescent value, terminating rectangular pulse 163. The duration of the rectangular pulse 163 is conveniently from 10 to 20 microseconds.

The power pulse generator 27 includes a grid-controlled gaseous electron tube 165, for example a Thyratron, the anode 166 of which is connected to the B+ terminal 52 via a suitable protective resistor 167, and the cathode 168 of which is connected to ground at 169 via a second resistor 170. A third resistor 171 is connected between the B+ terminal 52 and the cathode 168, and the second and third resistors 170 and 171 are suitably proportioned to maintain the tube 165 normally non-conductive. The transmitting transducer 28 is connected between the anode 166 and ground 169 in series with a capacitor 173, which is charged to the potential of the B+ source when the tube is non-conductive.

The control grid 174 of the tube is connected to ground 169 via a resistor 175, and to the second section anode 148 of the delay circuit 25 via a coupling capacitor 176. The rectangular pulse 163 is coupled to the gas tube control grid 174 via the capacitor 176. This capacitor and resistor 175 are so proportioned that they are a differentiating circuit with respect to the rectangular pulse 163, and produce a short negative pulse 177 corresponding to the left-hand or negatively directed edge thereof, and a short positive pulse 178 corresponding to the right-hand or positively directed edge thereof. The positive pulse 178 renders the gaseous electron tube 165 conductive, and the capacitor 173 in series with the transducer 28 is discharged therethrough. The current surge from capacitor 173 flows through the cathode resistor 170 and transducer 28, causing the production of compressional waves thereby. In this manner, operation of the transmitting transducer 28 is delayed, for example, from 10 to 20 microseconds following the final pulse 138.

The discharge circuit of the capacitor 173, which is a closed loop including the anode 166, cathode 168, resistor 170, transducer 28, and the capacitor 173 is prevented from oscillating by the tube 165. The positive pulse 178 is so short that it is completed during the first half cycle of oscillation of this circuit, and the tube is extinguished by virtue of the fact that the anode 166 thereof is substantially grounded when the capacitor 173 is discharged and direct current flows through resistor 167 to recharge it. In this connection it should be remembered that the transducer side of capacitor 173 is grounded.

The rectangular pulse circuit 26 comprises essentially a bi-stable circuit, here in the form of a flip-flop having first and second electron tube sections 181 and 182 so arranged that when one section is conductive the other section is non-conductive. The first section 181 has its anode 183 connected to the B+ terminal 52 via a suitable anode circuit resistor 184, and its cathode 192 connected to ground at 185 via a suitable cathode bias producing resistor 186 and a ground line 187. Ground line 187 is common to the receiver-amplifier 32 and sweep circuit 36 as well as the rectangular pulse circuit 26. The cathode resistor 186 is shunted by a capacitor 188. The control grid 191 of the first section 181 is connected to the first input 29 via a coupling capacitor 201, to the ground line 187 via a first resistor 193, and to the second section anode 194 via a second resistor 195. The second section anode 194 is connected to the B+ terminal 52 via a suitable anode resistor 196. The first and second resistors 193 and 195 and the second section anode resistor 196 are connected in series between the B+ terminal 52 and ground at 185, and, when the second section 182 is non-conductive, furnish a potential to the first section control grid 191 which maintains the first section 181 conductive. When the second section 182 is conductive the voltage drop across the second section anode resistor 196 lowers the potential of the first section control grid 191 below the value required to maintain the first section 181 conductive. In this connection, it should be remembered that, since one electron tube section or the other is always conductive, there is always a voltage drop in cathode resistor 186 which maintains the cathode 192 positive with respect to the ground line 187.

The cathode 197 of the second section 182 is connected directly to the first section cathode 192. The second section control grid 198 is connected to the second input 35 via a coupling capacitor 202, to the first section anode 183 via a third resistor 203, and to the ground line 187 via a fourth resistor 204. The third and fourth resistors 203 and 204 and the first section anode resistor 184 are connected in series between the B+ terminal 52 and ground at 185, and control the second section in the same manner as the first and second resistors 193 and 195 and the second section anode resistor 196 control the first section.

The output of the rectangular pulse circuit 26 is a negative rectangular pulse 205, which is generated in an output resistor 206 connected in series with a D. C. isolating capacitor 207 between the second section anode 194 and the ground line 187. When the final pulse 138 arrives at the first section control grid 191, the first section 181 is cut off and the second section 182 becomes conductive. The second section anode 194 is suddenly lowered in potential, due to the voltage drop in its resistor 196, thereby generating the left-hand edge of the negative rectangular pulse 205. When a negative calibration pulse 97 or 112, or a pulse 208 from the receiver, arrives at the second section control grid 198 via the second input 35, the second section 182 is cut off, and the anode 194 thereof is suddenly elevated in potential, since the voltage drop in resistor 196 substantially vanishes. This provides the right-hand edge of the negative rectangular pulse 205.

The receiver transducer 31 provides the receiver pulse 208 via the amplifier 32 in response to the receipt of a compressional wave pulse in response to a pulse produced by the transmitting transducer 28. The amplifier 32 includes three stages of amplification I, II, and III, of a well-known form, resistance-capacitance coupled together. A fourth stage IV is a phase-inverter, and includes an electron tube 211 of which the anode 212 is connected to the B+ terminal 52 via an anode circuit resistor 213 and the cathode 214 is connected to the ground line 187 via a cathode resistor 215. The control grid 216 of tube 211 is capacitively coupled to the anode 217 of stage III and connected to cathode 214 via a bias resistor 218. Resistor 218 maintains the control grid 216 at the same steady-state potential as cathode 214, to maintain stage IV normally conductive.

The amplified received signal is detected in a balanced detector 221 including first and second diode sections 222 and 223, respectively. The first section cathode 224 is connected to the ground line 187 via a suitable resistor 225, and the second section cathode 226 is similarly connected to ground via a suitable resistor 227. The first section cathode 224 is coupled to the cathode 214 of tube 211 via a capacitor 228, and the second section cathode 226 is coupled to the anode 212 of tube 211 via a capacitor 229. The first section anode 231 is connected to switch 34 via a resistor 232, and the second section anode 233 is connected to switch 34 via a resistor 234. The junction of resistors 232 and 234 is connected to an A. V. C. line 235, which provides automatic volume control for the amplifier 32 in well-known fashion. The output of the rectifier or detector 221 is the negative receiver pulse 208.

It will be appreciated that pulse 208 is in reality the envelope of a pulse train which arrives at the receiving transducer 31 in response to a pulse produced by the transmitting transducer 28. This is so for the reason that a short electric pulse produced in the transmitting transducer inevitably results in a somewhat differentiated acoustic pulse in the tested material, since a compression is followed by a rarefaction. Depending upon the decrement of the material, this causes a ringing effect, which produces a train of oscillation for each transmitted pulse. However, the leading, or left-hand, portion of pulse 208 is effective to actuate pulse generator 26, so that the length of such a train is of no consequence.

The negative rectangular pulse 205 of rectangular pulse generator 26 is provided to the sweep circuit 36. The sweep circuit includes a constant-current pentode type electron tube 241, the anode 242 of which is connected directly to the B+ terminal 52, and the cathode 243 of which is connected to the blade 246 of a selector switch 245. A first capacitor 247 is connected between a first contact 248 of switch 245 and ground line 187. A second capacitor 251 is connected between a second contact 252 of switch 245 and ground line 187. A variable trimmer capacitor 253 is connected in parallel with the second capacitor 251. A switch tube 254 is connected at its anode 256 to cathode 243 and at its cathode 257 to ground line 187, and thus in shunt with the capacitor 247 or 251 which is connected by switch 245 to cathode 243. The control grid 255 of the switch tube 254 is connected to the junction of resistor 206 and capacitor 207. The screen grid 258 of the constant current pentode 241 is connected to the movable tap 259 of a potentiometer 260, the resistor 261 of which is connected between the B+ terminal 52 and ground line 187. A capacitor 262 is connected between the screen grid 258 and cathode 243. The normal control and suppressor grids 263 and 264, respectively, of tube 241 are both connected to the cathode 243. The interelectrode capacitance of tube 241 is conventionally represented by a dotted-line capacitor 265 connected between the anode 242 and the cathode 243 thereof. A sweepwave output tube 266 has its anode 267 connected directly to the B+ terminal 52 and its cathode 268 connected to ground line 187 via a resistor 269. The control grid 271 of tube 266 is connected to the pentode cathode 243. Tube 266 is employed as a cathode follower.

In the operation of sweep circuit 36, the switch tube 254 is normally conductive, and is made non-conductive by the negative rectangular pulse 205. Switch 245 is operated to connect either capacitor 247 or 251 in circuit with pentode tube 241. When switch tube 254 is cut off, the connected capacitor is charged substantially linearly through the pentode tube. The resistance of the pentode tube is controlled by the setting of the movable arm 259 of potentiometer 260. The potential reached by cathode 243 due to the charge accumulated on the connected capacitor 247 or 251 is thus linearly proportional to the duration of the negative rectangular pulse 205, and governs the conductivity of the cathode follower tube 266, and hence the voltage developed in resistor 269. Switch 245 is a sweep range switch, and meter 38 is thereby calibrated with the aid of calibration pulse 97 or 112, as will presently be explained.

As will be appreciated, the voltage which appears across resistor 269 at cathode 268 is of saw-tooth form, starting at zero volts with the negative or left-hand edge of the negative rectangular pulse 205, and terminating at some positive value with respect to ground 185 depending upon the duration of pulse 205 and the value of the connected capacitor 247 or 251. This saw-tooth wave is coupled via a capacitor 273 to the sweep peak measuring circuit 37.

The sweep peak measuring circuit 37 includes a peak rectifier having a diode 275 of which the anode 276 is connected to capacitor 273 and the cathode 277 is connected to ground at 278 via a relatively high resistor 279 and a shunt-connected capacitor 281. A clamping diode 282 is connected at its cathode 283 to capacitor 273 and at its anode 284 to ground 278. A resistor 285 is connected in shunt with the clamping diode 282. Resistor 285 and 269 are connected in parallel with respect to the saw-tooth wave, resistor 285 being isolated from the D. C. of tube 266 by capacitor 273. Thus the sweep voltage is applied across diode 275 and capacitor 281 in series. The diode 275 permits the capacitor 281 to become charged to the peak voltage value of the sawtooth voltage, while the resistor 279, being very large, prevents the resultant charge from leaking off for several cycles of the sweep voltage wave. There is thus produced a substantially steady, or D. C., voltage of which the magnitude is proportional to the duration of the negative rectangular pulse 205.

A vacuum tube voltmeter circuit including two triodes 286 and 287 is employed to measure the D. C. voltage developed across capacitor 281. The anodes 288 and 289, respectively, of these two tubes are connected directly to a source of anode voltage (not shown) via a suitable B+ terminal 290. The cathode 291 of tube 286 is connected to ground 278 via a resistor 292, and the cathode 293 of tube 287 is connected to ground 278 via a resistor 294. Intermediate points 295 and 296 of resistors 292 and 294, respectively, are connected to switch 40, which is conveniently a double-pole, double-throw switch, and therethrough to either the recorder 39 or the meter 38. The control grid 297 of tube 286 is connected to the cathode 277 of diode 275. A resistor 298 is connected between B+ terminal 290 and ground 278, and the control grid 299 of tube 287 is connected to this resistor via a movable tap 300. Movable tap 300 is employed to set the zero adjustment of meter 38 when no sweep voltage waves are present.

Referring now to Fig. 3, 100 kc. pulses 310 and 320 from pulse generator 11 are shown on line A—A, 20 kc. pulses 311 and 321 from the first divider 12 are shown on line B—B 4 kc. pulses 312 and 322 from the second divider 14 are shown on line C—C, an 800 cycle pulse 313 from the third divider 19 is shown on line D—D, and a 160 cycle final output pulse 138 from the fourth divider 24 is shown on line E—E. Fig. 3 illustrates relative pulse positions only, and does not show pulse shapes, widths or polarities. Pulses 320, 321, 322, 313, and 138 normally would be expected to exist simultaneously. That is, pulse 313 is the pulse from divider 19 which causes pulse 138, pulse 322 is the pulse from divider 14 which causes pulse 313, pulse 321 is the pulse from divider 12 which causes pulse 322, and pulse 320 is the pulse from pulse generator 11 which causes pulse 321. However, due to naturally inherent delays that are present in the various electronic circuits, each effect succeeds its cause, and there is a measurable delay in the production of each of these pulses with respect to the pulse that caused it. Thus there is a delay which may be as much as 7 microseconds between pulse 321 and pulse 138, and a delay which may be as much as 5 microseconds between pulse 322 and pulse 138. The amount of each of these delays is quite small, but nevertheless their effects can be substantially eliminated from the circuit in the manner described below. The exact amount of each delay can be measured for a particular equipment in any known manner of determining the time difference between two consecutive pulses.

When selector switch 18 is set on its first position contact 17, the negative rectangular pulse 205 is initiated by final pulse 138 and terminated by a calibration pulse 97 which corresponds to the first 20 kc. pulse 311 following pulse 321 to the right in Fig. 3. This should measure a time interval of exactly 50 microseconds, but actually measures a time interval of, for example, 43 microseconds, due to the aforementioned delay which may be as much as 7 microseconds. Hence, when the meter 38 is calibrated with capacitor 247 in the sweep circuit 36, the needle thereof is set at a scale mark corresponding to 43 microseconds. This is accomplished with movable tap 259 in the sweep generating circuit 36.

With the selector switch 18 set on its second position contact 23, the negative rectangular pulse 205 is initiated by final pulse 138 and terminated by a calibration pulse 112 which corresponds to the first 4 kc. pulse 312 following pulse 322 to the right in Fig. 3. This should measure a time interval of exactly 250 microseconds, but actually measures a time interval of, for example, 245 microseconds. Hence, when the meter 38 is calibrated with capacitors 251 and 253 in the sweep circuit 36, the needle thereof is set at a scale mark corresponding to 245 microseconds. This is accomplished by adjusting the trimmer capacitor 253. The capacitors 251, 253, and 247 are so chosen that a single meter 38 may be employed for both the long range, which may conveniently be 500 microseconds, and the short range, which may conveniently be 100 microseconds.

When the selector switch 18 is set on its third position contact, the negative rectangular pulse 205 is initiated by final pulse 138 and terminated by the received pulse 208. Switch 245 may be operated to either its short range position 248 or its long range position 252, as desired. This feature is conveniently made automatic by providing switch 245 with a third contact 248', which is directly connected to the first contact 248, and with a fourth contact 252', which is directly connected to the second contact 252. At the same time, a fourth contact 17' is provided in switch 18, and is directly connected to the third contact 33 thereof. The contacts of each switch are then so related spatially in each switch that the blades 34 and 246 may be ganged to close simultaneously on contacts 17' and 248' or on contacts 17 and 248, or on contacts 23 and 252, or on contacts 33 and 252', respectively in each case. In switch 18, contact 17' is the "short range operate" position, while contact 33 is the "long range operate" position, for the system, while contacts 17 and 23 are the "calibrate 100" and "calibrate 500" positions, respectively.

With the internal calibration system just described, two accurate time measuring scales are provided. Since the first received pulse 208 to arrive at the receiving transducer 31 terminates the negative rectangular pulse 205, the present invention automatically and faithfully measures the time of travel of the first arrival energy at the receiving transducer 31 following operation of the transmitting transducer 28, and no other.

Due to inherent delays of a small order in the rectangular pulse circuit 26, and the fact that the negative rectangular pulse 205 can never have an absolutely rectangular shape, a further corrective factor is provided by the adjustable delay circuit 25. Referring to Fig. 4, it will be seen that while the desired sweep voltage curve 331 is absolutely linear, any actual sweep voltage curve 332 which can be obtained in practice has a non-linear region at the beginning thereof. This region exists for the first few, or perhaps ten microseconds of the sweep voltage wave. Hence the adjustable delay circuit 25 provides a delay of from 10 to 20 microseconds after the final pulse 138 has initiated a sweep voltage wave 332 before the transmitting transducer 28 is operated. At the end of this time, the actual sweep wave 332 is practically perfectly linear. There are, in addition, delays in the transducers themselves, the amplifier 32, and in the material under observation. The total of all the delays, including that of the delay circuit 25 are computed as follows. Let the total delay, $t_D$, be represented as shown on Fig. 4, namely the time of the beginning of the linear portion of curve 332. Make two observations of the minimum time of travel of an energy pulse through two paths in the tested material of different lengths $d_1$ and $d_2$ (Fig. 4). The times of travel over these paths are $t_1$ and $t_2$, respectively. If then a linearly increasing voltage wave 335 starting at $t_D$ be constructed, the time $t_1$ on curve 332 is simultaneous with time $t_x$ on curve 335. Time $t_2$ is common to both curves 332 and 335. The following proportion may then be set up:

$$\frac{d_1}{d_2} = \frac{t_x}{t_2}$$

whence $$\frac{d_1}{d_2} t_2 = t_x$$

With respect to the time when curve 332 actually starts, $t_1 - t_x = t_y$. Now inspect the triangle bounded by the straight portion of curve 332 between $t_D$ and $t_2$ and curve 335 between $t_D$ and $t_2$, and it becomes apparent that:

$$\frac{t_D}{t_y} = \frac{d_2}{(d_2 - d_1)}$$

From this it is apparent that:

$$t_D = t_y \left[ \frac{d_2}{(d_2 - d_1)} \right] = \left[ t_1 - \left( t_2 \frac{d_1}{d_2} \right) \right] \left[ \frac{d_2}{(d_2 - d_1)} \right]$$

The time $t_D$ is the total delay of all delays in the system, and is expressed in microseconds. This time is subtracted from all readings which appear on the meter 38. It may be subtracted physically by means of the zero adjust potentiometer tap 300. The meter is previously adjusted to zero when no pulses and no sweep wave are present. This is accomplished by means of fifth contacts 336 and 337 on switches 18 and 245, respectively, both of which contacts are grounded and arranged to be simultaneously contacted by blades 34 and 246, respectively. Contact 336 on switch 18 is the "zero adjust" position. After the meter is adjusted to zero and calibrated, the aforementioned subtraction of $t_D$ may be made either mentally or by means of potentiometer 300.

The squaring recorder 39 may be any device which presents a record in accordance with the mathematical square of an input voltage or current. An ordinary wattmeter is such a device, as is well known. The peak rectifier in circuit 37 is essentially a device which provides a direct voltage (D. C.) of which the magnitude is proportional to time, and furnishes this voltage to the recorder and meter 38. When the zero adjustment is made as aforementioned, the resulting D. C. is actually proportional to the time of travel observed in the specimen. If desired, the meter 38 may have a squaring scale. A presentation of the mathematical square of the time observed is useful in presenting automatically the value of Young's modulus, which is $\rho C^2$, where C is inversely proportional to $t_1$ the time of travel observed.

The system of the invention has many interesting uses. For example, by observing the minimum time of travel of energy over paths of similar lengths rectangularly directed with respect to each other, anisotropy of the material may be observed and quantitatively measured. This is valuable in studies of paper and other fibrous materials, cloths, sheet plastics, and other materials. In addition, observations may be made over many paths radially directed from a known point (where the transmitting transducer 28 may be located), and the isotropic nature of a material may be most closely observed.

It is intended that the claims that follow shall not be limited by the particular details of the embodiment thereof that has been described, inasmuch as many variations of those details will occur to those skilled in the art, but only by the prior art.

I claim:

1. A system for examining a solid material comprising means for producing an electric pulse, a delay circuit, a bi-stable circuit, a time wave generating circuit, a connection from said bi-stable circuit to said generating circuit, said bi-stable circuit being thereby arranged to initiate a timing wave when set into a first state and to terminate said timing wave when set into a second state, said electric pulse being furnished to both said delay circuit and said bi-stable circuit and arranged to set said bi-stable circuit into said first state, means connected to said delay circuit arranged to introduce a compressional wave energy pulse into said material at a first location thereon at a predetermined time following the initation of said timing wave, means at a second location on said material for receiving said wave energy pulse and producing received electric energy in response thereto, and means responsive to the first received energy of said pulse for setting said bi-stable circuit into said second state.

2. A system for examining a solid material comprising means for producing an electric pulse, a delay circuit, a two-condition circuit, a time wave generating circuit, a connection from said two-condition circuit to said generating circuit, said two-condition circuit being thereby arranged to initiate a timing wave when set into a first condition and to terminate said timing wave when set into a second condition, said electric pulse being furnished to both said delay circuit and said two-condition circuit and arranged to set said two-condition circuit into said first condition, means connected to said delay circuit arranged to introduce a compressional wave energy pulse into said material at a first location thereon at a predetermined time following the initiation of said timing wave, means at a second location on said material for receiving said wave energy and producing received electric energy in response thereto, and means responsive to the first received energy of said pulse for setting said two-condition circuit into said second condition.

3. A system for examining a solid material comprising first electromechanical means at a first location on said material for introducing vibrational energy into said material, second electromechanical means at a second location on said material to detect said energy, means coupled to both said introducing and said detecting means to generate a mono-pulse voltage wave which is initiated in synchronism with the introduction of said energy into said material and is terminated in synchronism with the detection of the first energy to arrive at said detecting means, a time wave generating circuit connected to said voltage wave generating means and arranged to measure the time duration of said voltage wave, and signal delay means between said first electromechanical means and said voltage wave generating means.

4. A system for examining a solid material comprising first electromechanical means at a first location on said material for introducing vibrational energy into said material, second electromechanical means at a second location on said material to detect said energy, means coupled to both said introducing and said detecting means to generate a mono-pulse voltage wave, a time wave generating circuit connected to said voltage wave generating means and arranged to measure the time duration of said voltage wave, signal delay means connected between said first electromechanical means and said voltage wave generator, and a source of initiating signals connected to the junction of said delay means and said voltage wave generator, thereby to initiate said voltage wave and subsequently to actuate said first electromechanical means, said second electrochemical means being coupled in a fashion to terminate said voltage wave.

5. A system for examining a solid material comprising a synchronizing signal source, a signal delay means and a voltage pulse generator which initiates a pulse in response to a first signal and terminates said pulse in response to a second signal connected at their inputs in parallel to said source, a time wave generating circuit connected to said voltage pulse generator and arranged to measure the time duration of said voltage pulse, said source providing said first signal to said generator and to the input of said delay means, a first electromechanical transducer at a first location on said material electrically connected to the output of said delay means, and a second electromechanical transducer at a second location on said material electrically connected to said generator to provide said second signal thereto.

References Cited in the file of this patent

UNITED STATES PATENTS

| | | |
|---|---|---|
| 2,280,226 | Firestone | Apr. 21, 1942 |
| 2,439,131 | Firestone | Apr. 6, 1948 |
| 2,448,399 | Shaw | Aug. 31, 1948 |
| 2,466,539 | Evans | Apr. 5, 1949 |
| 2,466,711 | Kenyon | Apr. 12, 1949 |
| 2,484,034 | Isbister | Oct. 11, 1949 |
| 2,485,584 | Ginzton | Oct. 25, 1949 |
| 2,499,520 | Modlowski | Mar. 7, 1950 |

FOREIGN PATENTS

| | | |
|---|---|---|
| 469,417 | Great Britain | July 26, 1937 |